US007431760B2

United States Patent
Chino et al.

(12) United States Patent
(10) Patent No.: US 7,431,760 B2
(45) Date of Patent: *Oct. 7, 2008

(54) INK AND INK-JET RECORDING INK

(75) Inventors: Tomohiro Chino, Minami-Ashigara (JP); Toshiki Fujiwara, Minami-Ashigara (JP); Masaru Takasaki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 374 days.

This patent is subject to a terminal disclaimer.

(21) Appl. No.: 10/541,726

(22) PCT Filed: Jun. 7, 2004

(86) PCT No.: PCT/JP2004/008260

§ 371 (c)(1), (2), (4) Date: Jul. 11, 2005

(87) PCT Pub. No.: WO2004/113463

PCT Pub. Date: Dec. 29, 2004

(65) Prior Publication Data

US 2006/0162616 A1  Jul. 27, 2006

(30) Foreign Application Priority Data

Jun. 18, 2003 (JP) ............... 2003-173485
Oct. 14, 2003 (JP) ............... 2003-353498

(51) Int. Cl.
C09D 11/00 (2006.01)
C09D 11/02 (2006.01)

(52) U.S. Cl. ............ 106/31.48; 106/31.5; 106/31.52

(58) Field of Classification Search ............ 106/31.51, 106/31.52, 31.48, 31.5
See application file for complete search history.

(56) References Cited

U.S. PATENT DOCUMENTS

| 4,124,581 | A | 11/1978 | Vor der Brück et al. |
| 4,125,581 | A | 11/1978 | Rasmussen |
| 4,180,503 | A | 12/1979 | vor de Brück et al. |
| 7,281,788 | B2 * | 10/2007 | Yabuki et al. ............... 347/100 |
| 7,303,272 | B2 * | 12/2007 | Taguchi et al. ............. 347/100 |
| 2004/0089200 | A1 * | 5/2004 | Fujiwara et al. .......... 106/31.48 |
| 2005/0057629 | A1 * | 3/2005 | Taguchi et al. ............. 347/100 |
| 2005/0243151 | A1 * | 11/2005 | Chino et al. ............... 347/100 |
| 2006/0009357 | A1 * | 1/2006 | Fujiwara et al. ............ 503/227 |
| 2006/0044375 | A1 * | 3/2006 | Taguchi et al. ............. 347/100 |
| 2006/0164483 | A1 * | 7/2006 | Yabuki et al. ............... 347/100 |
| 2006/0268086 | A1 * | 11/2006 | Kawakami et al. .......... 347/100 |
| 2006/0272544 | A1 * | 12/2006 | Chino et al. ............... 106/31.27 |
| 2007/0070160 | A1 * | 3/2007 | Takasaki et al. ............ 347/100 |
| 2007/0176992 | A1 * | 8/2007 | Arai et al. .................. 347/100 |

FOREIGN PATENT DOCUMENTS

| EP | 0 280 434 | A2 | 8/1988 |
| EP | 1 229 083 | A2 | 8/2002 |
| JP | 52-76331 | | 6/1977 |
| JP | 59-133259 | | 7/1984 |
| WO | 02/083795 | A2 | 10/2002 |
| WO | WO 03/062330 | * | 7/2003 |
| WO | 03/087238 | A1 | 10/2003 |
| WO | WO 2004/016699 | * | 2/2004 |
| WO | WO 2004/029166 | * | 4/2004 |

OTHER PUBLICATIONS

Supplementary European Search Report issued in corresponding EP Application No. 04 73 6270 on Jan. 26, 2007, EPO, Munich, DE (in English).

* cited by examiner

*Primary Examiner*—Helene Klemanski
(74) *Attorney, Agent, or Firm*—Buchanan Ingersoll & Rooney PC

(57) ABSTRACT

An ink containing an azo dye having, in total, at least 13 conjugated π electrons in an aromatic ring thereof that is not directly bonded to any azo group.

14 Claims, No Drawings

INK AND INK-JET RECORDING INK

TECHNICAL FIELD

This invention relates to an ink containing a dye having specific physical properties and a method of improving solution stability of a dye.

BACKGROUND ART

Color image recording materials have now come to be the mainstream of image recording materials. Currently prevailing color image recording materials include ink-jet recording materials, electrophotographic recording materials, transfer type silver halide light-sensitive materials, printing inks, and recording pens.

These color image recording materials use colorants (including dyes and pigments) of additive or subtractive primaries to implement full color reproduction or recording. Nevertheless, colorants having absorption characteristics suitable for favorable color reproduction and fastness against various conditions of use or environmental conditions are not available for the time being. From this viewpoint, improvements have been keenly demanded.

Ink jet recording has been popularized rapidly and will see further development because of low material cost, high speed, low noise, and ease of color recording. Fundamentally, ink jet recording is divided into a continuous method in which ink droplets are continuously allowed to fly and a drop-on-demand method in which ink droplets are ejected in response to image information signals. The mechanism of drop formation includes a piezoelectric system in which pressure is applied to ink by a piezoelectric element to eject ink droplets, a thermal system in which heat is applied to ink to create bubbles whereby to eject an ink droplet, an ultrasonic system, and an electrostatic system. Ink-jet inks include aqueous ink, oily ink, and hot-melt or solid ink.

Dyes used in the ink-jet recording inks are required to have (1) good solubility or dispersibility in ink solvents, (2) capability of high-density recording, (3) satisfactory hues, (4) color fastness against light, heat, active gases in the atmosphere (e.g., $No_x$, oxidizing gases such as ozone, $SO_x$, etc.), (5) resistance against water or chemicals, (6) good fixability on media with minimized feathering, (7) stability in ink formulations, (8) nontoxicity, (9) high purity, and (10) inexpensiveness. It is extremely difficult to obtain dyes that satisfy high levels of these requirements, nevertheless. In particular, there has been a strong demand for dyes with satisfactory black hue that are fast to light, humidity and heat, have a high molar absorptivity, provide high print quality in text printing, and, when used in printing a substrate having an ink receiving layer containing white, porous, inorganic pigment particles, exhibit resistance against environmental oxidizing gases such as ozone.

The following properties are required, in common, of the dyes for the above-described applications: absorption characteristics fit for color reproduction, fastness under environmental conditions, such as light, heat, humidity, and oxidizing gases (e.g., ozone), fastness against chemicals such as sulfurous acid gas, and a high molar absorptivity.

Generally used black dyes include disazo dyes and trisazo dyes. In the manufacture of the disazo and trisazo dyes, non-heterocyclic compounds, such as phenols, naphthols, naphthylamines, and anilines, are widely used as starting materials. Disazo dyes prepared from these starting materials are disclosed, e.g., in EP 761771 and Japanese Patent 2716541, but all of them are unsatisfactory in light fastness and seriously poor in fastness to oxidizing gases such as ozone in the atmosphere.

In seeking for a colorant fast to oxidizing gases such as ozone, the present inventors have reached an idea of chiefly using a heterocyclic compound in place of the conventional materials, such as phenols, naphthols, naphthylamines or anilines. Disazo and trisazo dyes that have hitherto been proposed are disclosed, e.g., in German Patent 2743097, JP-A-59-133259, and JP-A-52-76331. However, all these known dyes are those developed for dyeing fiber. The literature is silent on such performance as aimed at in the present invention, that is, whether the dye has absorption characteristics preferred for color reproduction and fastness under environmental conditions of use, such as light fastness, heat fastness, humidity fastness, fastness to chemicals (e.g., sulfurous acid gas), and, in particular, fastness to oxidizing gases, e.g., ozone. Neither does the literature give a suggestion on what structure is the most suited for image formation as contemplated in the present invention. Although JP-A-52-76331 discloses water-soluble disazo dyes containing two or more heterocyclic rings, the water-suoluble dyes turned out to have insufficient water solubility for use in ink jet applications.

DISCLOSURE OF THE INVENTION

An object of the present invention is to provide an ink which provides a color image or coloring material excellent in hue and fastness and undergoes reduced change in physical properties even in long-term storage and is therefore useful for printing, such as ink jet printing, and writing.

The present inventors have conducted extensive and intensive studies in pursuit of a dye that has a satisfactory hue, high fastness to light and ozone, and stability against long-term storage. As a result they have found that the above object of the invention is accomplished by a water-soluble azo dye having specific physical properties.

The present invention provides an ink containing an azo dye having, in total, at least 13 conjugated π electrons in aromatic rings that are not directly bonded to any azo group.

The present invention also provides an ink containing an azo dye with an improved residual ratio (retention). The azo dye with an improved residual ratio is obtained by introducing, to a starting azo dye whose residual ratio is 60% or lower as measured in accordance with a stability test method described below, an aromatic ring in such an amount to add at least 6 conjugated π electrons at a position that is not directly bonded to any azo group of the starting azo dye. The stability test method is carried out by dissolving 0.1 mmol of a dye under test in 10 ml of water, adding 84 mg of sodium hydrogencarbonate to the solution, heating the mixture under reflux for 1 hour, cooling the mixture, and spectrophotometrically measuring the residual ratio of the dye.

The present invention provides preferred embodiments of the above-described inks, wherein:

1) The azo dye is a water-soluble disazo or polyazo dye.
2) The azo dye has at least one of the following physical properties 1 to 5:

Physical Property 1:

The absorption spectrum measured in a dimethylformamide (DMF) solvent shows a maximum absorption wavelength $\lambda_{max}$ (DMF) between 680 nm and 570 nm.

Physical Property 2:

The oxidation potential is more noble than 1.0 V (vs. SCE).

Physical Property 3:

The maximum absorption wavelength of the absorption spectrum measured in a water solvent, $\lambda_{max}$(water), satisfies relationship: $|\lambda_{max}(DMF)-\lambda_{max}(water)| \geqq 30$ nm.

Physical Property 4:

The molar absorptivity in a DMF solvent, $\epsilon$ (DMF), and that in a water solvent, $\epsilon$ (water), satisfy relationship: $\epsilon$ (water)/$\epsilon$(DMF)$\leqq 0.9$.

Physical Property 5:

When $\lambda$max (water) is defined as the maximum absorption wavelength of the aggregated form in water solvent and $\lambda$max (DMF) is defined as the maximum absorption wavelength of the monomer in dimethylformamide solvent, and further when the absorbance of the dye in water solvent at the maximum absorption wavelength of the aggregated form measured in water solvent is represented by Abs (aggregate) and the absorbance of the dye in water solvent at the maximum absorption wavelength of the monomer measured in dimethylformamide solvent is represented by Abs (monomer), Physical Property 5 satisfies the relation: Abs (monomer)/Abs (aggregate)$\leqq 0.75$ 3) The azo dye contains a nitrogen-containing 6-membered ring.

4) The azo dye contains a 5-membered heterocyclic ring.

The present invention also provides an ink-jet recording ink containing any of the above-described inks.

The ink according to the present invention is stable against long-term storage and provides a color image or coloring material excellent in hue and fastness. In particular, an ink-jet recording ink and an ink jet recording method using the ink of the invention provide an image with a satisfactory hue and high fastness to light and active gases in the atmosphere, particularly ozone gas.

BEST MODE OF CARRYING OUT OF THE INVENTION

Terminologies throughout the specification and claims of the present invention are explained below. Terminology "aromatic ring directly bonded to an azo group" denotes the whole of an aromatic ring bonded to an azo group. When, for example, a naphthalene ring is bonded to an azo group, the term indicates not the benzene ring directly adjacent to the azo group but the whole naphthalene ring. When a biphenyl group is bonded to an azo group, one of the two phenyl groups that is bonded to the azo ring is "an aromatic ring directly bonded to an azo group", while the other is "an aromatic ring that is not directly bonded to an azo group". The term "aromatic ring" includes not only an aryl group but an aromatic heterocyclic group.

The azo dye used in the invention has, in total, at least 13 aromatic conjugated $\pi$ electrons in an aromatic ring that is not directly bonded to any azo group. The number of the thus defined conjugated $\pi$ electrons is counted as follows. In an azo dye having, for example, one benzene ring and one naphthalene ring both as an aromatic ring that is not directly bonded to any azo group, the total number of aromatic conjugated pi electrons is 6 plus 10, giving 16. The term "aromatic conjugated pi electrons" means conjugated pi electrons contained in aromatic rings that include heterocyclic rings and are not limited to 6-membered rings.

Dye (f) shown below has 12 conjugated pi electrons on the aromatic rings that are not directly bonded to the azo group. It has a residual ratio (stability in an aqueous solution) of 40% or less as measured by a stability test defined in the present invention.

Dye (f):

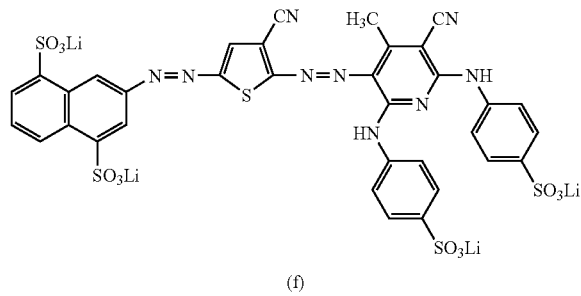

(f)

Dye (f) is liable to decompose, which is an unexpected phenomenon in view of high stability of common azo dyes. This phenomenon can be accounted for theoretically from the $\lambda_{max}$ (DMF) and the oxidation potential of the dye. Dye (f) satisfies physical property 1 relating to $\lambda_{max}$ (DMF), i.e., 680 nm$\geqq\lambda_{max}$ (DMF)$\geqq 570$ nm, and physical property 2 relating to oxidation potential (i.e., more noble than 1.0 V (vs. SCE)). Physical property 1 is preferred as a black dye. Physical property 2 is necessary for improving fastness.

In order for a dye to have its $\lambda_{max}$ in such a long wavelength region, the lowest unoccupied molecular orbital (LUMO) must be close to the highest occupied molecular orbital (HOMO). In order for a dye to have such a high oxidation potential, the dye should have allow HOMO level. Accordingly, in order to satisfy the two conditions of absorption wavelength and potential, the LUMO level must be low. However, a dye with a low LUMO level is more susceptible to nucleophilic attack and therefore less stable in a solution. In other words, in developing highly fast dyes, molecular design applied to dyes with long-wavelength absorption so as to increase the oxidation potential necessarily results in reduction of solution stability.

In contrast, dye a-2 (shown in Table 1 given later) obtained by introducing a phenyl group to the 4-position of the thiophene ring of dye (f) has a solution stability (residual ratio) of more than 80%. Dye a-3 (shown in Table 1) obtained by introducing a naphthyl group to the same position of dye (f) has a solution stability of more than 90%. Introduction of a 4-methylphenyl group to the same position (see dye a-1 shown in Table 1) also results in a solution stability exceeding 90%. These data obviously verify that solution stability can be improved by introducing a phenyl, naphthyl or 4-methylphenyl group. It is considered that introduction of the aromatic ring to a position that is not directly bonded to the azo group to add six or more aromatic conjugated pi electrons produces an aggregating effect, a hydrophobilizing agent, and a steric effect and that introduction of a methyl group to the 4-position of the phenyl group also brings about an aggregating effect, a hydrophobilizing effect, and the like. These effects seem to result in improved solution stability of the starting dye.

One of the structural features common to dyes a-1, a-2, and a-3 resides in that the total number of conjugated pi electrons of the aromatic rings that are not directly bonded to any azo group is at least 13. Another feature common to these dyes lies in that they have more aromatic rings that are not directly bonded to any azo group than a corresponding dye whose residual ratio is 60% or lower as measured by the specific stability test method by an amount enough to increase the total number of aromatic conjugated pi electrons by at least 6 and, as a result, exhibit improved solution stability.

The specific stability test adopted in the present invention is carried out in accordance with the following method.

Stability Test Method:

In 10 ml of water is dissolved 0.1 mmol of a test dye, and 84 mg of sodium hydrogencarbonate is added to the solution, followed by heating under reflux for 1 hour. After cooling, the solution is analyzed with a spectrophotometer to determine the residual ratio of the dye.

The dye with improved solution stability preferably has a solution stability of 80% or higher, still preferably 90% or higher.

The present invention provides a dye having a long wavelength absorption, high solution stability and satisfactory fastness and therefore offers high industrial benefit.

With respect to physical property 1, $\lambda_{max}$ (DMF) is still preferably from 590 nm to 680 nm and particularly preferably from 610 nm to 680 nm. In case where a dye does not dissolve in 100% DMF, the $\lambda_{max}$ (DMF) measurement is carried out by first dissolving the dye in water of an amount not more than 10% by weight of DMF and then diluting the aqueous solution with DMF.

Physical property 3 relating to $|\lambda_{max}(DMF)-\lambda_{max}(water)|$, physical property 4 relating to $\epsilon(water)/\epsilon(DMF)$, physical property 5 relating to Abs (monomer)/Abs (aggregate) are explained further as below.

As a result of study on dyes exhibiting satisfactory fastness, the inventors have found that dyes with satisfactory fastness satisfy at least one of physical property 3, i.e., $|\lambda_{max}(DMF)-\lambda_{max}(water)|\geq 30$ nm; physical property 4, i.e., $(\epsilon(water)/\epsilon(DMF))\leq 0.9$; and physical property 5, i.e., Abs (monomer)/Abs(aggregate)$\leq 0.75$. It is assumed that dyes satisfying at least one of the physical properties 3, 4, and 5 are in an aggregated form in water.

In general, there are two possible causes of a dye's having different $\lambda_{max}$ values in different solvents. One is that a dye shows different aggregated states in different solvents. The other is solvatochromism. The difference in $\lambda_{max}$ as observed in the present invention is assumed to be due to the first-mentioned cause.

When dye molecules aggregate with each other, E can reduce. The value $\epsilon(water)/\epsilon(DMF)$ means a quotient of $\epsilon$ in a water solvent, where dye molecules easily aggregate, divided by $\epsilon$ in a DMF solvent, where dye molecules hardly aggregate. This value can be taken as a measure of a degree of aggregation.

In addition, information about the aggregation of a dye can be obtained from the absorption spectrum, too. From the absorption spectrum in an aqueous solvent, information about the aggregation of a dye can be obtained. When λmax (water) is defined as the maximum absorption wavelength of the aggregated form in water solvent and λmax (DMF) is defined as the maximum absorption wavelength of the monomer in dimethylformamide solvent, Abs (monomer)/Abs (aggregate) represents the apparent ratio of the non-aggregated molecule whereby Abs (aggregate) is the absorbance of the dye at the maximum absorption wavelength of the aggregated form measured in water solvent and Abs (monomer) is the absorbance of the dye at the maximum absorption wavelength of the monomer measured in dimethylformamide solvent (both of Abs (aggregate) and Abs (monomer) being measured in water solvent at a concentration of $2\times 10^{-5}$ mol/L). Namely, the smaller this value is, the larger the number of the aggregated molecules is. When a dye with a high oxidation potential takes on the aggregated form described hereinabove, the dye exhibits a still higher fastness.

The azo dye according to the present invention is preferably a disazo dye or a polyazo dye. More specifically, the azo dye is preferably a disazo or polyazo dye represented by formula (A):

wherein A, B, and C each represent a substituted or unsubstituted aromatic ring or a substituted or unsubstituted heterocyclic ring (A and C are monovalent, and C is divalent). Where the substituent of A, B or C contains an aromatic azo group, the dye of formula (A) is a polyazo dye.

The nitrogen-containing 6-membered ring that can be present in the azo dye of the invention is a ring containing a nitrogen atom as a ring-forming atom, such as a pyridine ring. The nitrogen-containing 6-membered ring is preferably one represented by formula (1) shown below. The dye of the present invention preferably has such a nitrogen-containing 6-membered ring as the moiety represented by C in formula (A).

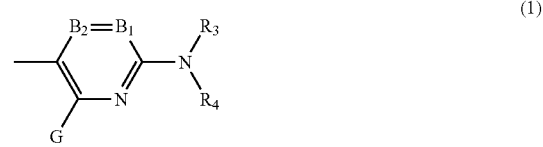

wherein $B_1$ and $B_2$ each represent $=CR_1-$, $-CR_2=$ or a nitrogen atom provided that $B_1=B_2\neq N$; G, $R_1$, and $R_2$ each represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an anilino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, each of which may have a substituent; $R_3$ and $R_4$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may have a substituent, provided that $R_3=R_4\neq H$; or $R_1$ and $R_2$ may be taken together, or $R_3$ and $R_4$ may be taken together, to form a 5- or 6-membered ring.

The 5-membered heterocyclic ring that can be present in the azo dye of the invention is a 5-membered ring containing a hetero atom and is preferably an aromatic ring. The hetero atom preferably includes sulfur, nitrogen, and oxygen. The 5-membered heterocyclic ring includes a thiophene ring, a thiazole ring, and an imidazole ring. The 5-membered heterocyclic ring may be condensed with a ring to form a benzothiazole ring, a thienothiazole ring, etc. Each heterocyclic ring may have a substituent. A thiophene ring, a thiazole ring, an imidazole ring, a benzothiazole ring, and a thienothiazole ring represented by formulae (2) to (6) shown below, respectively, are particularly preferred. The thiophene ring and the thiazole ring are the most preferred. It is especially preferred for the dye of formula (A) to have the above-described 5-membered heterocyclic ring as the group B.

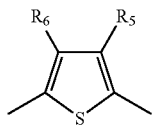

(2)

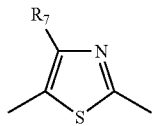

(3)

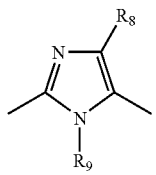

(4)

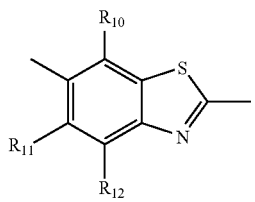

(5)

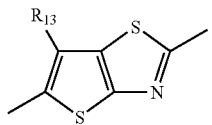

(6)

wherein $R_5$, $R_6$, $R_7$, $R_8$, $R_9$, $R_{10}$, $R_{11}$, $R_{12}$, and $R_{13}$ each have the same meaning as G, $R_1$, and $R_2$ in formula (1).

Of the azo dyes according to the present invention, particularly preferred are those represented by formulae (7) and (8):

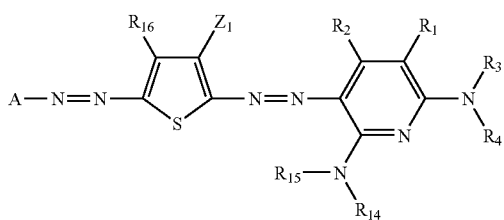

(7)

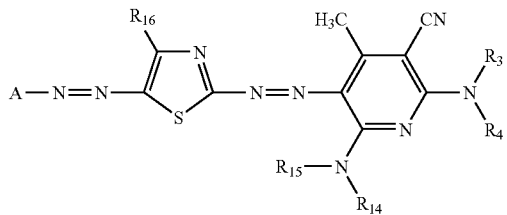

(8)

wherein A, $R_1$, $R_2$, $R_3$, and $R_4$ are as defined above; $Z_1$ represents an electron attracting group having a Hammett substituent constant σp of 0.20 or greater; $R_{14}$ and $R_{15}$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; and $R_{16}$ represents an alkyl group, an aromatic group or a heterocyclic group.

$Z_1$ is preferably an electron attracting group having a Hammett substituent constant σp of 0.30 or greater, still preferably 0.45 or greater, particularly preferably 0.60 or greater. The Hammett substituent constant σp of $Z_1$ is preferably 1.0 or smaller.

Examples of electron attracting groups whose Hammett substituent constant σp is 0.60 or greater are a cyano group, a nitro group, an alkylsulfonyl group (e.g., methanesulfonyl), and an arylsulfonyl group (e.g., benzenesulfonyl). Examples of electron attracting groups having a Hammett substituent constant σp of 0.45 or greater include those recited above and, in addition, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl and N,N-dimethylsulfamoyl), and a halogenated alkyl group (e.g., trifluoromethyl). Electron attracting group having a Hammett substituent constant σp of 0.30 or greater include those recited above and, in addition, an acyloxy group (e.g., acetoxy), a carbamoyl group (e.g., N-ethylcarbamoyl and N,N-dibutylcarbamoyl), a halogenated alkoxy group (e.g., trifluoromethoxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted with at least two electron attracting groups whose Hammett substituent constants σp are 0.15 or greater (e.g., 2,4-dinitrophenyl and pentachlorophenyl), and a heterocyclic group (e.g., 2-benzoxazolyl, 2-benzothiazolyl, and 1-phenyl-2-benzimidazolyl). Electron attracting groups whose Hammett substituent constant σp is 0.20 or greater include those enumerated above and, in addition, a halogen atom. Preferred of these electron attracting groups are an acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, and a halogenated alkyl group having 1 to 20 carbon atoms. Still preferred are a cyano group, an alkylsulfonyl group having 1 to 20 carbon atoms, and an arylsulfonyl group having 6 to 20 carbon atoms. A cyano group is the most preferred.

$R_{14}$ and $R_{15}$ each preferably represent a hydrogen atom, an aromatic group, a heterocyclic group, an acyl group, an alkylsulfonyl group or an arylsulfonyl group, still preferably a hydrogen atom, an aromatic group or a heterocyclic group.

$R_{16}$ preferably represents an aromatic group.

A preferably represents an aromatic group.

Each of the groups recited above as for formulae (7) and (8) may have a substituent, such as the groups represented by G, $R_1$, and $R_2$ of formula (1) and water-soluble groups.

The azo dyes are preferably water-soluble. Water-soluble dyes are dyes having a water-soluble group. Preferred water-soluble groups include a sulfo group, a carboxyl group, a thiocarboxyl group, a sulfino group, a phosphono group, and a dihydroxyphosphino group, with a sulfo group and a carboxyl group being particularly preferred. The number of the water-soluble groups possessed by the water-soluble azo dyes is preferably 3 or greater, still preferably 4 or greater. The water-soluble groups may be bonded to any positions but are preferably bonded to A or C of formula (A).

Further, the carboxyl group, phosphono group and sulfo group may be in the form of a salt whereby the example of the counter ion forming the salt includes ammonium ion, an alkali metal ion (exemplified by lithium ion, sodium ion and potassium ion) and an organic cation (exemplified by tetramethylammonium ion, tetramethylguanidium ion, and teteramethylphosphonium ion). Among these, lithium salts and ammonium salts are preferred, and lithium salts are more preferred.

It is preferred that the conjugated pi electrons of the aromatic ring that is not directly bonded to the azo group be present in B and/or C in formula (A).

The oxidation potential of the azo dye according to the invention is preferably more noble than 1.0 V (vs. SCE). The more noble, the more favorable. The oxidation potential is still preferably more noble than 1.2 V (vs. SCE). The reason why the azo dye satisfying the oxidation potential condition provides a color image with improved ozone fastness is assumed to be as follows. Dye decomposition by ozone gas is influenced by the relationship between HOMO of the dye and LUMO of ozone gas. That is, the interaction between the dye's HOMO and the ozone's LUMO oxidizes the colorant compound, resulting in a reduction in image density. Accordingly, the azo compound with a specified oxidation potential and thereby having a lowered HOMO level has reduced reactivity with ozone gas, which brings about improved ozone fastness.

The oxidation potential value represents electron mobility from a sample toward an electrode. The greater the value (the more noble), the less the electron mobility from a sample to an electrode (the less susceptible to oxidation). From the aspect of the compound structure, the oxidation potential becomes more noble by introducing an electron attracting group, and less noble by introducing an electron donating group.

As will be explained below in more detail, an oxidation potential value means a potential of the anode at which a compound loses electrons in voltammetry and is admittedly considered to approximately agree with the ground state HOMO energy level of the compound.

The oxidation potential is measured by cyclic voltammetry or DC polarography using a saturated calomel electrode (SCE) as a reference electrode. A sample to be measured is dissolved in a solution of a supporting electrolyte, such as sodium perchlorate or tetrapropylammonium perchlorate, in a solvent, such as dimethylformamide or acetonitrile, in a concentration of $1 \times 10^{-4}$ to $1 \times 10^{-6}$ mol·dm$^{-3}$, and the electric potential of the working electrode is measured using an SCE (saturated calomel electrode) as a reference electrode. Appropriate electrolyte and solvent are selected according to the oxidation potential or solubility of the sample. For the details of such selection reference can be made to P. Delahay, *New Instrumental Methods in Electrochemistry*, Interscience Publishers, 1954, A. J. Bard, et al., *Electrochemical Methods*, John Wiley & Sons, 1980, and Akira Fujishima, et al., *Denki Kagaku Sokuryoho*, Gihodo, 1984, 101-118.

The measured oxidation potential value can vary by several tens of millivolts under the influences of liquid junction potential or solution resistance. Such variation can be corrected by use of a standard sample (e.g., hydroquinone) to assure the reproducibility of the measurement results.

The oxidation potential as referred to in the present invention is the value obtained by DC polarography on a $1 \times 10^{-3}$ mol·dm$^{-3}$ solution of a compound under test in a water/N,N-dimethylformamide (2/98) mixed solvent containing 0.1 mol·dm$^{-3}$ of tetrapropylammonium perchlorate as a supporting electrode using a SCE as a reference electrode, a graphite electrode as a working electrode, and a platinum electrode as a counter electrode.

The requirement for a noble oxidation potential can be fulfilled by, for example, (i) selecting an azo compound inherently having a structure assuring a noble oxidation potential or (ii) introducing to an appropriate position of an azo compound an electron attracting group, i.e., a substituent having a large Hammett substituent constant σp, a measure of the substituent's electronegativity or electropositivity. To select a dye structure providing a noble oxidation potential is a preferred approach from the standpoint of not only ozone resistance but molecular designing with ease of introducing an arbitrary electron attracting or donating group to adjust color fastness, hue, and physical properties of the compound.

When an electron attracting group is introduced to an arbitrary position of an azo compound to make the oxidation potential more noble so as to reduce the reactivity with ozone (an electrophilic agent), a Hammett substituent constant σp can be made use of as a measure of substituent's electronegativity or electropositivity in selecting the electron attracting group to be introduced. The oxidation potential can be made more noble by introducing a substituent having a large σp value.

A Hammett substituent constant σp is briefly explained below. The Hammett's rule is an empirical rule advocated by L. P. Hammett in 1935 in an attempt to quantitatively discuss the influences of a substituent of a benzene derivative on the reaction or equilibrium, the validity of which has been widely accepted nowadays. Substituent constants obtained by the Hammett's rule include σp and σm values. These values of various substituents are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents have been described by referring to their Hammett substituent constants σp, it should be understood that such description applies to not only the substituents whose Hammett substituent constants σp are known from the literature but those whose Hammett substituent constants σp are unknown from the literature but are to fall within a range in question when determined in accordance with the Hammett's rule. Although some of the structures represented by formulae (1) and (2) are not benzene derivatives, σp values are referred to as a measure of the electron effect of their substituents irrespective of the position of substitution. The σp value is used in that sense in the present invention.

Specific examples of the azo compound contained in the coloring composition of the present invention are shown below. However, the azo compound used in the present invention is not restricted to the examples to be enumerated below. And, the carboxyl group, phosphono group and sulfo group may be in the form of a salt whereby the example of the counter ion forming the salt includes ammonium ion, an alkali metal ion (exemplified by lithium ion, sodium ion and potassium ion) and an organic cation (exemplified by tetramethylammonium ion, tetramethylguanidium ion, and teteramethylphosphonium ion).

The dye of the present invention can be synthesized by the coupling reaction of a diazonium component with a coupler. Some synthesis examples are shown below.

TABLE 1

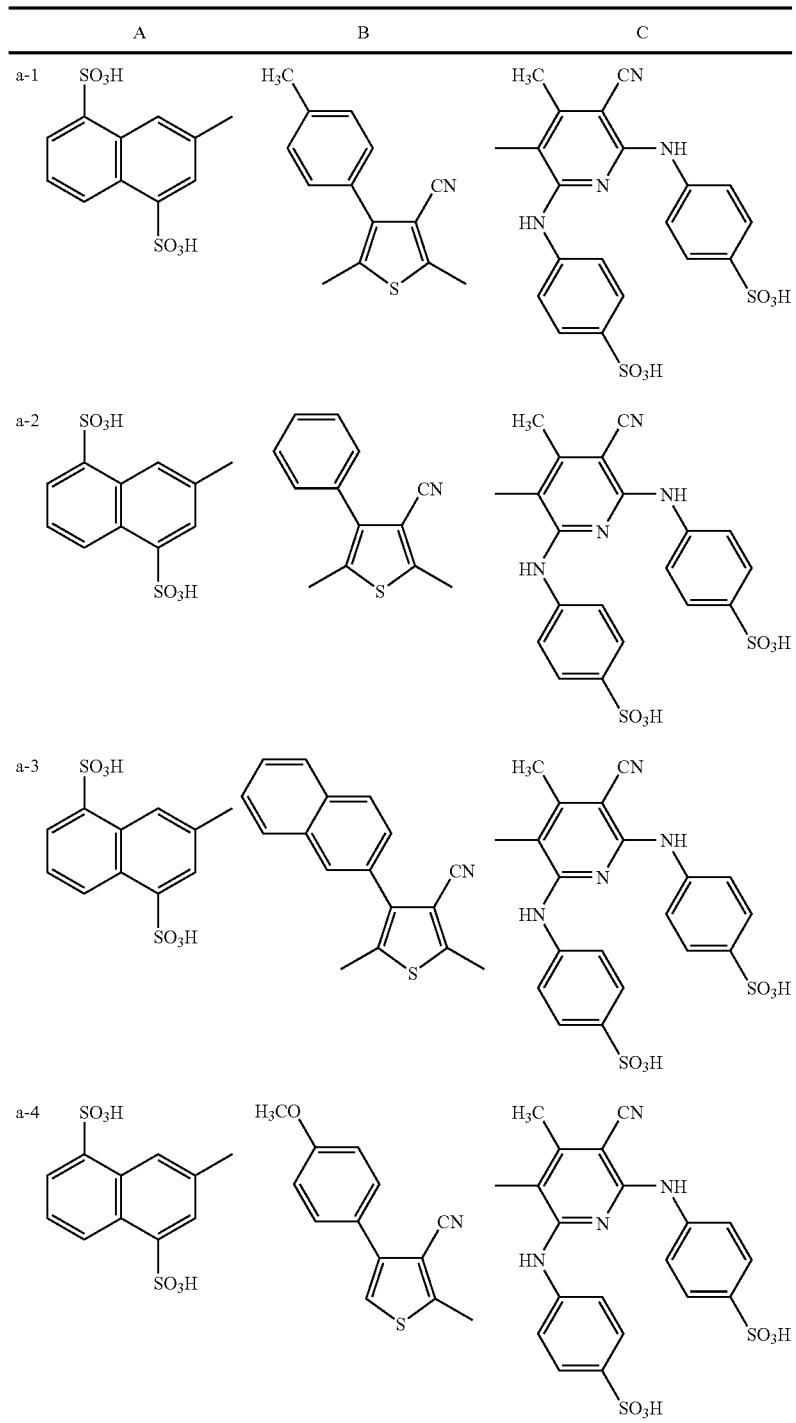

TABLE 1-continued

| | A | B | C |
|---|---|---|---|
| a-5 | (naphthalene with SO₃H groups and methyl) | (acetamidophenyl-dimethylthiophene-carbonitrile) | (pyridine derivative with CN, CH₃, NH-phenyl-SO₃H groups) |
| a-6 | (naphthalene with SO₃H groups and methyl) | (chlorophenyl-dimethylthiophene-carbonitrile) | (pyridine derivative with CN, CH₃, NH-phenyl-SO₃H groups) |

TABLE 2

| | A | B | C |
|---|---|---|---|
| b-1 | (naphthalene with SO₃H groups and methyl) | (tolyl-dimethylthiazole) | (pyridine derivative with CN, CH₃, NH-phenyl-SO₃H groups) |
| b-2 | (naphthalene with SO₃H groups and methyl) | (phenyl-dimethylthiazole) | (pyridine derivative with CN, CH₃, NH-phenyl-SO₃H groups) |

TABLE 2-continued

| | A | B | C |
|---|---|---|---|
| b-3 | | | |
| b-4 | | | |
| b-5 | | | |
| b-6 | | | |

TABLE 3

| | A | B | C |
|---|---|---|---|
| c-1 | 5-methylisophthalic acid | 2,5-dimethyl-4-(4-methylphenyl)thiophene-3-carboxylic acid | 6-[(4-sulfophenyl)amino]-2-[(4-sulfophenyl)amino]-3-cyano-4,5-dimethylpyridine |
| c-2 | 5-methylbenzene-1,3-disulfonic acid | 2,5-dimethyl-4-phenylthiophene-3-carboxamide | 6-[(4-sulfophenyl)amino]-2-[(4-sulfophenyl)amino]-3-cyano-4,5-dimethylpyridine |
| c-3 | 7-methylnaphthalene-1,3-disulfonic acid | methyl 2,5-dimethyl-4-(naphthalen-2-yl)thiophene-3-carboxylate | 6-[(4-sulfophenyl)amino]-2-[(4-sulfophenyl)amino]-3-cyano-4,5-dimethylpyridine |
| c-4 | 7-methylnaphthalene-1,3,5-trisulfonic acid | 2,5-dimethyl-4-(naphthalen-2-yl)thiazole | 6-[(4-sulfophenyl)amino]-2-[(4-sulfophenyl)amino]-3-cyano-4,5-dimethylpyridine |

TABLE 3-continued
| | A | B | C |
|---|---|---|---|
| c-5 | | | |
| c-6 | | | |
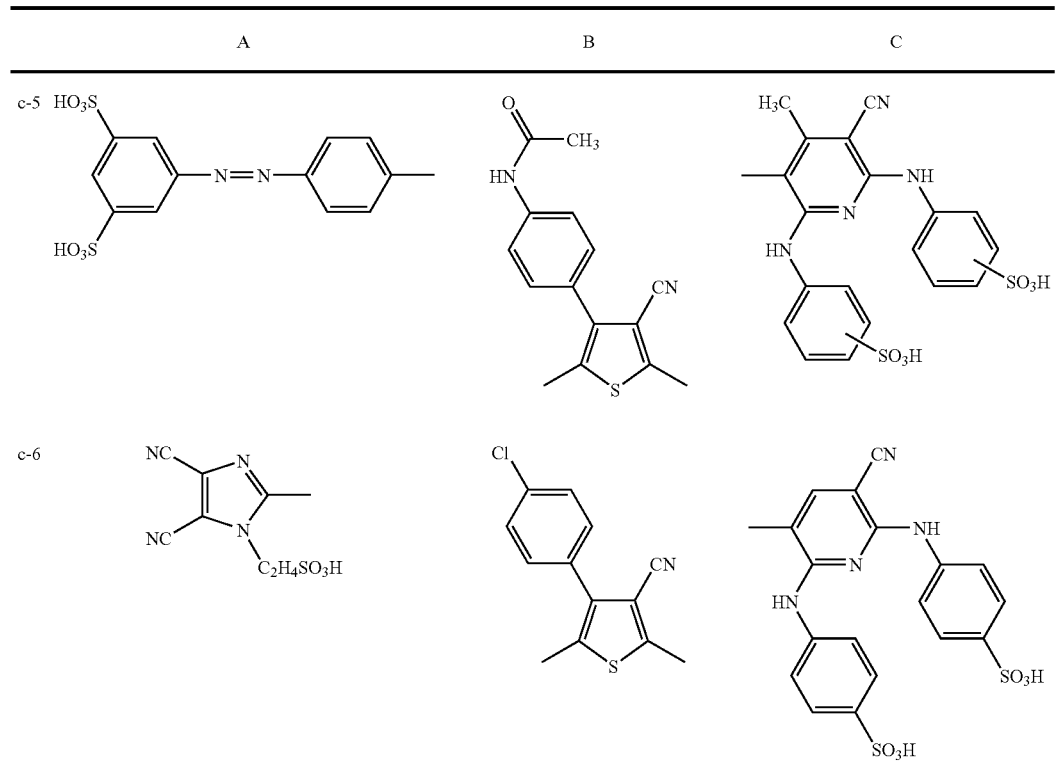
TABLE 4
| | A | B | C |
|---|---|---|---|
| d-1 | | | |
| d-2 | | | |
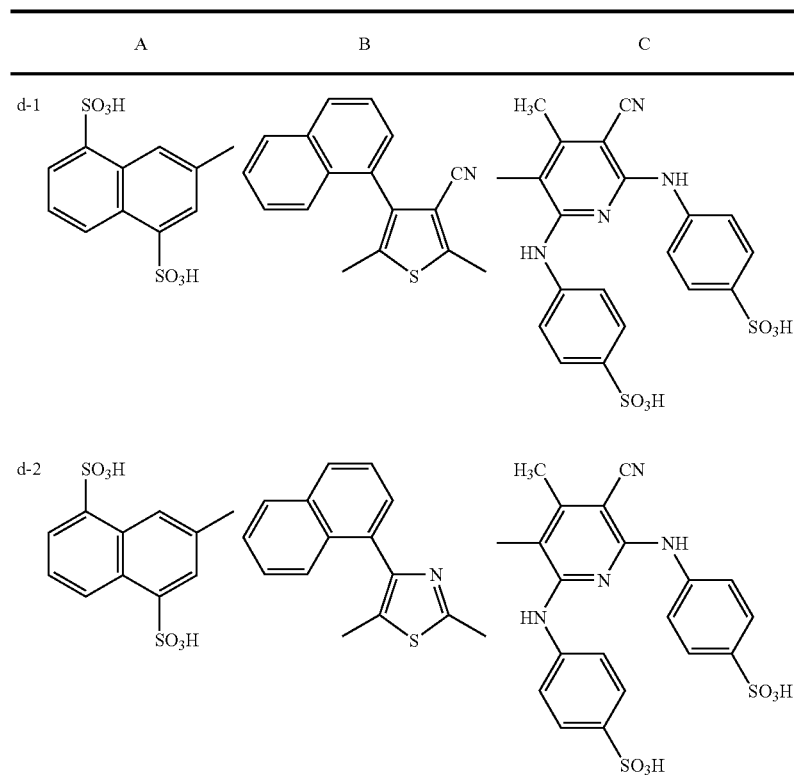

TABLE 4-continued
| | A | B | C |
|---|---|---|---|
| d-3 | 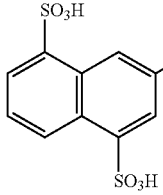 | 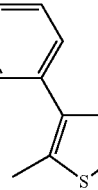 | 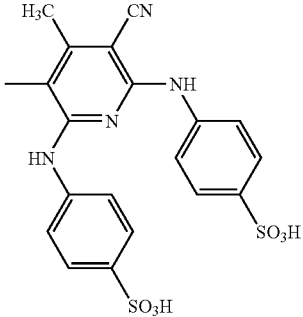 |
| d-4 | 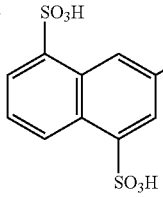 | 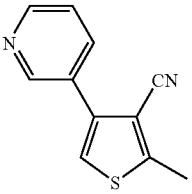 | 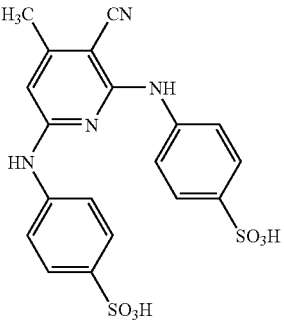 |
| d-5 | 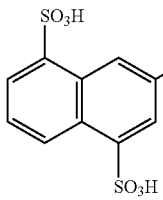 | 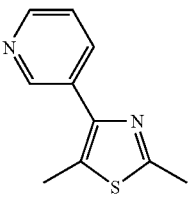 | 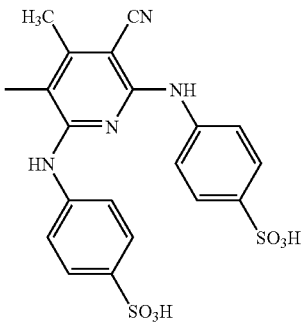 |
| d-6 | 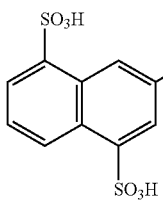 | 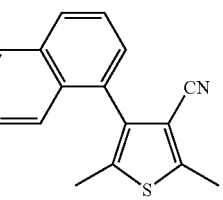 | 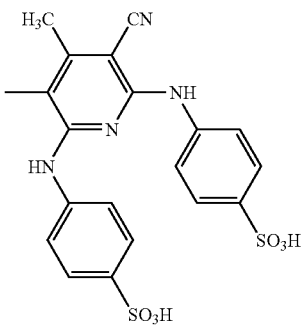 |

TABLE 5

| | A | B | C |
|---|---|---|---|
| e-1 | 3-methylnaphthalene-1,5-disulfonic acid | 2-methyl-5-(pyridin-2-yl)thiazole | pyridine derivative with CN, CH₃, two NH-phenyl-SO₃H groups |
| e-2 | 3-methylnaphthalene-1,5-disulfonic acid | 2-methyl-5-(pyridin-4-yl)thiazole | pyridine derivative with CN, CH₃, two NH-phenyl-SO₃H groups |
| e-3 | 3-methylnaphthalene-1,5-disulfonic acid | 2,5-dimethyl-4-cyano-3-(thiazol-2-yl)thiophene | pyridine derivative with CN, CH₃, two NH-phenyl-SO₃H groups |
| e-4 | 3-methylnaphthalene-1,5-disulfonic acid | 2-methyl-4-(thiazol-2-yl)thiazole | pyridine derivative with CN, CH₃, two NH-phenyl-SO₃H groups |

TABLE 5-continued

| | A | B | C |
|---|---|---|---|
| e-5 | | | |
| e-6 | | | |

The azo dyes of the invention can be synthesized by the coupling reaction between a diazo component and a coupler. Synthesis Examples are shown below.

SYNTHESIS EXAMPLE 1
Synthesis of Dye b-2:

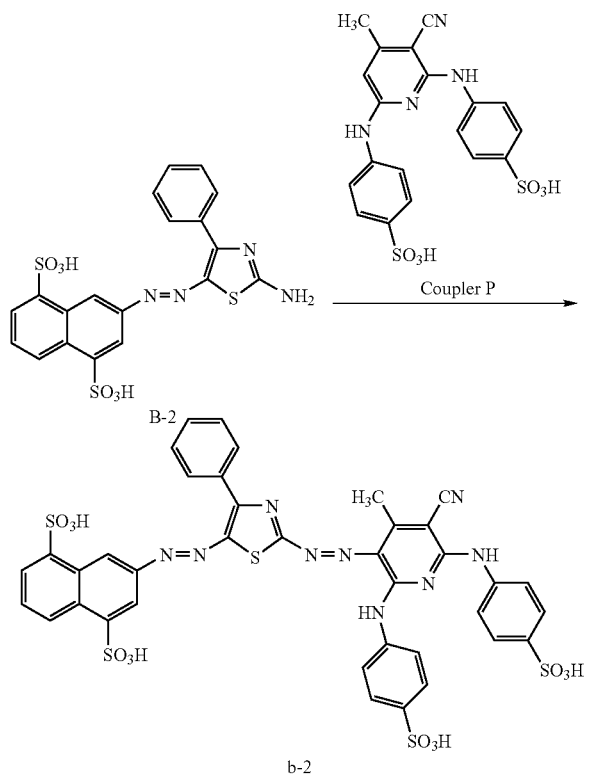

1) Preparation of Diazo Component B-2

To 190 ml of water was dissolved 22.7 g (65.4 mmol) of a disodium salt of 7-aminonaphthalene-1,5-disulfonic acid (hereinafter referred to as "C acid"). To the solution was added 25 ml of concentrated hydrochloric acid, followed by cooling to 0° C. A solution of 4.74 g (68.7 mmol) of sodium nitrite in 20 ml of water was added thereto at 0° to 5° C., followed by stirring at that temperature for 1 hour to prepare a C acid diazonium salt solution. Separately, 10.0 g (59.5 mmol) of 2-amino-4-phenylthiazole was dispersed in 150 ml of water. The C acid diazonium salt solution was added to the resulting dispersion at room temperature. The mixture was adjusted to a pH of 2 by addition of sodium acetate. After confirming disappearance of thiophene by liquid chromatography, an additional amount of sodium acetate was added to adjust to pH 7. The resulting slurry was filtered, and the filter cake was washed with isopropyl alcohol and dissolved in 400 ml of water. To the solution was added 31 g of lithium chloride to conduct salting out. The resulting slurry was filtered, and the filter cake was washed with isopropyl alcohol and dried to give 26.3 g (crude yield: 88%) of diazo component B-2.

2) Preparation of Dye b-2

To a mixture of 300 ml of phosphoric acid and 150 ml of acetic acid was added 7.0 g of 40% nitrosylsulfuric acid, followed by cooling to −2° C. A solution of 10 g (19.9 mmol) of diazo component B-2 in 30 ml of water was added thereto dropwise at −20 to 0° C., followed by stirring at −2° to 0° C. for 1 hour to prepare a B-2 diazonium salt solution. Separately, 9.8 g (19.9 mmol) of coupler P was dissolved in 450 ml of water, and the solution was cooled to 5° C. The above-prepared B-2 diazonium salt solution was added dropwise to the coupler P solution at 5° to 10° C., followed by stirring at that temperature for 1 hour. The reaction mixture was heated up to 40° C., and 52 g of lithium chloride was added thereto to effect salting out. The resulting slurry was filtered, and the filter cake was washed with isopropyl alcohol. The washed cake was dissolved in 300 ml of water, and 100 ml of concentrated hydrochloric acid was added to the solution. The solution was heated up to 40° C., and 49 g of lithium chloride was added to conduct salting out. The resulting slurry was filtered, and the filter cake was washed with isopropyl alcohol. The resulting wet cake was re-dissolved in a mixed solvent of 30 ml of water and 60 ml of methanol. The solution was neutralized to pH 7 by addition of a lithium hydroxide aqueous solution and then heated to 65° C. To the heated solution was dropwise added 270 ml of isopropyl alcohol to perform crystallization. The resulting slurry was filtered, and the filter cake was washed with isopropyl alcohol. A quarter of the resultant wet cake was dissolved in 30 ml of water and purified by column chromatography on a Sephadex LH-20 column available from Amersham Biosciences to yield 2.3 g (47%) of the title compound (dye b-2).

M/S: $(M-H)^-=961$; $(M-2H)^{2-}=480$; $\lambda_{max}$ (water)=588 nm

SYNTHESIS EXAMPLE 2

Synthesis of Dye b-3:

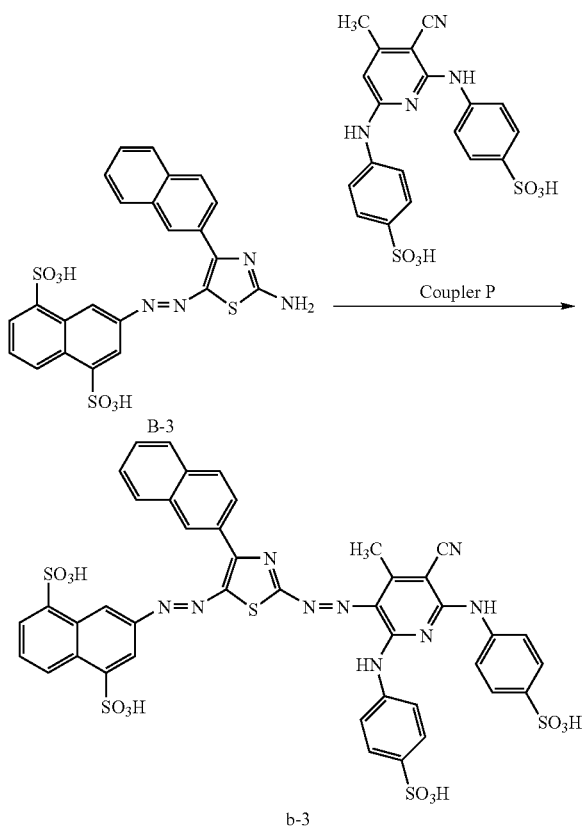

1) Preparation of Diazo Component B-3

To 140 ml of water was dissolved 16.9 g (48.6 mmol) of a disodium salt of C acid, and 19 ml of concentrated hydrochloric acid was added thereto, followed by cooling to 0° C. A solution of 3.35 g (48.6 mmol) of sodium nitrite in 12 ml of water was added thereto at 0° to 5° C., followed by stirring at that temperature for 1 hour to prepare a C acid diazonium salt solution. Separately, 10.0 g (44.2 mmol) of 2-amino-4-naphthylthiazole was dispersed in 500 ml of water. The C acid diazonium salt solution was added to the resulting dispersion at room temperature. After stirring for 30 minutes, the mixture was adjusted to a pH of 4 by addition of sodium acetate, followed by heating to 40° C., at which the mixture was stirred for 2 hours. After confirming disappearance of thiazole by liquid chromatography, an additional amount of sodium acetate was added to adjust to pH 7. The resulting slurry was filtered, and the filter cake was washed with isopropyl alcohol and dissolved in 400 ml of water. To the aqueous solution was added 29 g of lithium chloride to conduct salting out. The resulting slurry was filtered, and the filter cake was washed with isopropyl alcohol and dried to give 19.3 g (crude yield: 79%) of diazo component B-3.

2) Preparation of Dye b-3

To a mixture of 300 ml of phosphoric acid and 150 ml of acetic acid was added 6.3 g of nitrosylsulfuric acid, followed by cooling to −2° C. A solution of 10 g (18.1 mmol) of diazo component B-3 in 30 ml of water was added thereto dropwise at −2° to 0° C., followed by stirring at that temperature for 1 hour to prepare a B-3 diazonium salt solution. Separately, 9.0 g (18.1 mmol) of coupler P was dissolved in 450 ml of water, and the solution was cooled to 5° C. The above-prepared B-3 diazonium salt solution was added dropwise to the coupler P solution at 5° to 10° C., followed by stirring at 50 to 10° C. for 1 hour. The reaction mixture was heated up to 40° C., and 38 g of lithium chloride was added thereto to effect salting out. The resulting slurry was filtered, and the filter cake was washed with isopropyl alcohol. The wet cake was dissolved in 300 ml of water, and 100 ml of concentrated hydrochloric acid was added to the solution. The solution was heated up to 40° C., and 43 g of lithium chloride was added to conduct salting out. The resulting slurry was filtered, and the filter cake was washed with isopropyl alcohol. The resulting wet cake was re-dissolved in a mixed solvent of 30 ml of water and 60 ml of methanol. The solution was neutralized to pH 7 by addition of a lithium hydroxide aqueous solution and then heated to 65° C. To the heated solution was dropwise added 270 ml of isopropyl alcohol to perform crystallization. The resulting slurry was filtered, and the filter cake was washed with isopropyl alcohol. A quarter of the resultant wet cake was dissolved in 30 ml of water and purified by column chromatography on a Sephadex LH-20 column available from Amersham Biosciences to yield 2.1 g (45%) of the title compound (dye b-3).

M/S: $(M-H)^-=1011$; $(M-2H)^{2-}=505$; $\lambda_{max}$ (water)=600 nm

Other azo dyes of the invention were synthesized in accordance with Synthesis Examples 1 and 2. The physical properties of the synthesized azo dyes are shown in Table 6 below. Table 6 also shows the physical properties of dye (f) as a comparative example.

TABLE 6

| Dye | $\lambda_{max}$ (DMF) | Oxidation Potential | Stability (%) | $\lambda_{max}$ (water) − $\lambda_{max}$ (DMF) | ε(water)/ ε(DMF) | Abs (monomer)/ Abs (aggregate) |
|---|---|---|---|---|---|---|
| (f) | 658 | 1.30 | 28 | 68 | 0.92 | 0.54 |
| a-1 | 658 | 1.32 | 92 | 55 | 0.94 | 0.49 |
| a-2 | 652 | 1.31 | 76 | 51 | 0.95 | 0.49 |
| a-3 | 656 | 1.31 | 89 | 48 | 0.88 | 0.62 |
| a-4 | 651 | 1.31 | 82 | 44 | 0.69 | 0.86 |
| b-6 | 652 | 1.33 | 94 | 44 | 0.78 | 0.63 |
| d-4 | 656 | 1.32 | 72 | 56 | 0.97 | 0.49 |
| e-3 | 676 | 1.32 | 87 | 60 | 0.90 | 0.47 |
| b-2 | 628 | 1.35 | 83 | 40 | 0.94 | 0.76 |
| b-3 | 636 | 1.31 | 96 | 36 | 0.74 | 0.93 |
| a-5 | 658 | 1.32 | 93 | 54 | 0.88 | 0.54 |
| e-5 | 660 | 1.33 | 76 | 56 | 0.90 | 0.50 |
| d-5 | 620 | 1.32 | 81 | 37 | 0.99 | 0.73 |
| e-4 | 638 | 1.32 | 70 | 42 | 0.86 | 0.79 |

The ink-jet recording ink of the invention is prepared by dissolving or dispersing the above-described azo dye in a lipophilic or aqueous medium, preferably an aqueous medium. The ink can contain additives according to necessity provided the effects of the invention are not affected. Useful additives include anti-drying agents (wetting agents), anti-browning agents, emulsion stabilizers, penetrants, ultraviolet absorbers, antiseptics, antifungals, pH adjustors, surface tension modifiers, defoaming agents, viscosity modifiers, dispersants, dispersion stabilizers, anti-corrosive agents, and chelating agents. The additives can be added directly to a water-soluble ink formulation. Where an oil-soluble dye is used in the form of a dispersion, the additives are usually added to the prepared dye dispersion but may be added to either an oily phase or an aqueous phase before the dispersing operation.

Anti-drying agents are added to prevent clogging of ink jet orifices of a recording head in an ink jet printer due to ink drying. Water-soluble organic solvent shaving a lower vapor pressure than water are suitable anti-drying agents. Examples of water-soluble organic solvents useful as an anti-drying agent include polyhydric alcohols, such as ethylene glycol, propylene glycol, diethylene glycol, polyethylene glycol, thiodiglycol, dithiodiglycol, 2-methyl-1,3-propanediol, 1,2, 6-hexanetriol, acetylene glycol derivatives, glycerol, and trimethylolpropane; lower alkyl ethers of polyhydric alcohols, such as ethylene glycol monomethyl (or ethyl) ether, diethylene glycol monomethyl(or ethyl) ether, and triethylene glycol monoethyl(or butyl) ether; heterocyclic compounds, such as 2-pyrrolidine, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol and diethanolamine; and urea derivatives. Preferred of them are polyhydric alcohols, such as glycerol and diethylene glycol. These anti-drying agents can be used either individually or as a mixture thereof. A suitable amount of the anti-drying agent in an ink formulation is 10 to 50% by weight.

Penetrants are used to accelerate ink penetration into paper. Suitable penetrants include alcohols, such as ethanol, isopropyl alcohol, butanol, di(or tri)ethylene glycol monobutyl ether, and 1,2-hexanediol; sodium laurylsulfate, sodium oleate; and nonionic surface active agents. They generally develop sufficient effects when added to ink formulations in amounts from 5 to 30% by weight, from which range an appropriate amount of addition is selected so as not to cause feathering or print-through.

Ultraviolet absorbers are used to improve image stability against light. Useful ultraviolet absorbers include benzotriazole compounds such as those described in JP-A-58-185677, JP-A-61-190537, JP-A-2-782, JP-A-5-197075, and JP-A-9-34057; benzophenone compounds such as those described in JP-A-46-2784, JP-A-5-194483, and U.S. Pat. No. 3,214,463; cinnamic acid compounds such as those described in JP-B-48-30492, JP-B-56-21141, and JP-A-10-88106; triazine compounds such as those described in JP-A-4-298503, JP-A-8-53427, JP-A-8-239368, JP-A-10-182621, and JP-T-8-501291; and the compounds disclosed in *Research Disclosure* No. 24239. Compounds that absorb ultraviolet light to emit fluorescence, namely fluorescent whitening agents, typified by stilbene compounds and benzoxazole compounds, are also usable.

Anti-browning agents are used to improve image preservability. Useful anti-browning agents include organic ones and metal complex ones. The organicanti-browning agents include hydroquinones, alkoxyphenols, dialkoxyphenols, phenols, anilines, amines, indanes, chromans, alkoxyanilines, and heterocyclic compounds. The metal complex anti-browning agents include nickel complexes and zinc complexes. Specific examples of useful anti-browning agents are given in patents referred to in *Research Disclosure* No. 17643, VII-I to -J, ibid No. 15162, ibid No. 18716, p. 650, left col., ibid No. 36544, p. 527, ibid No. 307105, p. 872, and ibid No. 15162 and JP-A-62-215272, pp. 127-137.

Antifungals that can be used include sodium dehydroacetate, sodium benzoate, sodium pyridinethione-1-oxide, ethyl p-hydroxybenzoate, and 1,2-benzisothiazolin-3-one and its salts. The antifungal is preferably added to an ink formulation in an amount of 0.02 to 1.00% by weight.

Neutralizing agents, such as organic bases and inorganic alkalis, can be used as a pH adjustor. For the purpose of improving storage stability of ink-jet recording inks, a pH adjustor is preferably added to adjust an ink formulation to a pH of 6 to 10, still preferably 7 to 10, taking use in summer into consideration.

Surface tension modifiers that can be used in the invention include nonionic, cationic or anionic surface active agents. Ink-jet recording inks preferably have a surface tension of 20 to 60 mN/m, still preferably 25 to 45 mN/m, and a viscosity of 30 mN/m or less, still preferably 20 mN/m or less. Examples of suitable anionic surface active agents are fatty acid salts, alkylsulfates, alkylbenzenesulfonates, alkylnaphthalenesulfonates, dialkyl sulfosuccinates, alkylphosphates, naphthalenesulfonic acid-formalin condensates, and polyethylene glycol alkylsulfates. Examples of suitable nonionic surface active agents are polyethylene glycol alkyl ethers, polyethylene glycol alkyl allyl ethers, polyethylene glycol fatty acid esters, sorbitan fatty acid esters, polyoxyethylene sorbitan fatty acid esters, polyoxyethylene alkylamines, glycerol fatty acid esters, and ethylene oxide/propylene oxide block copolymers. A series of acetylenic polyethylene oxide surfactants available from Air Products & Chemicals, Inc. under the trade name Surfynol are also preferably used. Amphoteric surface active agents of amine oxide type, such as N,N-dimethyl-N-alkylamine oxides, are preferred as well. Additionally the surface active agents described in JP-A-59-157636, pp. 37-38 and *Research Disclosure* No. 308119 (1989) are also useful.

Defoaming agents that can be used if needed include fluorine-containing compounds, silicone compounds, and chelating agents typified by ethylenediaminetetraacetic acid.

The aqueous medium includes water and a mixture of water and a minor proportion of a water-miscible organic solvent. The water-miscible organic solvent includes alcohols (e.g., methanol, ethanol, propanol, isopropyl alcohol, butanol, isobutanol, sec-butanol, tert-butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglyol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-miscible organic solvents can be used either individually or as a combination thereof.

The ink-jet recording ink of the present invention preferably contains the azo dye in an amount of 0.2 to 30 parts by weight per 100 parts by weight of the total ink formulation.

The ink can contain other colorants in combination with the azo dye, in which case the amount of the other colorants is preferably chosen so that the total colorant content may fall within the above range.

The ink is applicable to not only monochromatic but full-color image formation. In full color applications, a magenta ink, a cyan ink, and a yellow ink are used. Yellow, magenta, and cyan dyes to be used in these ink formulations are arbitrarily selected.

Suitable yellow dyes includes aryl- or heterylazo dyes having, as a coupler component, phenols, naphthols, anilines, hetero rings (e.g., pyrazolone and pyridone), open-chain active methylene compounds, and the like; azomethine dyes having open-chain active methylene compounds as a coupler component; methine dyes, such as benzylidene dyes and monomethine oxonol dyes; and quinone dyes, such as naphthoquinone dyes and anthraquinone dyes. In addition, quinophthalone dyes, nitro dyes, nitroso dyes, acridine dyes, and acridinone dyes are also useful.

Suitable magenta dyes include aryl- or heterylazo dyes having, as a coupler component, phenols, naphthols, anilines, hetero rings (e.g., pyrazine), open-chain active methylene compounds, etc.; azomethine dyes having open-chain active methylene compound as a coupler component; and anthrapyridone dyes.

Suitable cyan dyes include aryl- or heterylazo dyes having, as a coupler component, phenols, naphthols, anilines, etc.; azomethine dyes having, as a coupler component, phenols, naphthols, hetero rings (e.g., pyrrolotriazole), etc.; polymethine dyes, such as cyanine dyes, oxonol dyes, and merocyanine dyes; carbonium dyes, such as diphenylmethane dyes, triphenylmethane dyes, and xanthene dyes; phthalocyanine dyes, anthraquinone dyes, indigo dyes, and thioindigo dyes.

Yellow or cyan dyes which do not develop a color until part of their chromophore is dissociated are also useful. Counter cations in this type of dyes include inorganic ones such as alkali metals and ammonium, organic ones such as pyridinium and a quaternary ammonium salt, and polymeric ones having such a cation as a partial structure.

The ink-jet recording ink of the invention is used to form an image, on being given energy, on known image receiving materials, such as plain paper, resin coated paper, dedicated paper described, e.g., in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947, films, paper common to printing and electrophotography, fabric, glass, metal, and earthenware.

In order to impart gloss, water resistance or improved weather resistance to an image, a polymer latex compound can be used in combination in image forming. The latex compound may be applied to the image receiving material before, after or simultaneously with application of a colorant. It may be incorporated into either the image receiving material or the ink or may be used alone in the form of liquid. Specifically, the methods proposed in JP-A-2002-166638, JP-A-2002-121440, JP-A-2002-154201, JP-A-2002-144696, JP-A-2002-080759, JP-A-2002-187342, and JP-A-2002-172774.

Recording paper or film as image receiving materials that can be printed on an ink jet printer with the ink of the present invention usually comprises a substrate and an ink-receiving layer, and, if desired, a backcoating layer.

The substrate of recording paper or film includes paper, synthetic paper, plastic films or sheets. The paper substrate is made of chemical pulp, e.g., Laubholz bleached kraft pulp (LBKP) and Nadelholz bleached kraft pulp (NBKP), mechanical pulp, e.g., ground pulp (GP), pressurized ground woodpulp (PGW), refiner mechanical pulp (RMP), thermo-chemical pulp (TMP), chemi-thermo-mechanical pulp (CTMP), chemi-mechanical pulp (CMP), and chemi-ground pulp (CGP), and used paper pulp, e.g., deinked pulp (DIP), and the like. The substrate is produced from a pulp slurry that can contain, according to necessity, pigments, binders, and known additives, such as sizes, fixatives, cationic agents, paper strengthening agents, and so forth by using a Fourdrinier paper machine, a cylinder paper machine, etc. The substrate preferably has a thickness of 10 to 250 μm and a basis weight of 10 to 250 g/m$^2$. An ink receiving layer and a backcoating layer may be provided on the substrate either directly or via a size press coating of starch, polyvinyl alcohol, etc. or an anchor coating. The substrate may be subjected to flattening treatment with a calendering machine, such as a machine calender, a temperature-gradient calender or a soft nip calender. Substrates suitable for printing with the ink of the invention include paper laminated on both sides with a polyolefin (e.g., polyethylene), polystyrene, polyethylene terephthalate, polybutene, or a copolymer comprising monomer units of these homopolymers, and plastic films. It is preferred to add to the laminating polyolefin a white pigment (e.g., titanium oxide or zinc oxide) or a tinting dye (e.g., Cobalt Blue, ultramarine, or neodymium oxide).

The ink receiving layer that can be provided on the substrate is formed of a pigment and an aqueous binder. The pigment is preferably a white pigment, including inorganic ones, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic ones, such as styrene pigments, acrylic pigments, urea resins, and melamine resins. Inorganic porous white pigments are preferred. Synthetic amorphous silica having a large pore surface area is particularly suited. While both silicic anhydride obtained by a dry process and hydrous silicic acid obtained by a wet process are usable, hydrous silicic acid is desirable.

The aqueous binder used in the ink receiving layer includes water-soluble polymers, such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, and polyalkylene oxide derivatives; and water-dispersible polymers, such as styrene-butadiene latices and acrylic emulsions. These aqueous binders can be used either individually or as a mixture of two or more thereof. Preferred of them are polyvinyl alcohol and silanol-modified polyvinyl alcohol in view of their adhesion to pigment particles and capability of forming a peel resistant coat.

The ink receiving layer can further contain mordants, waterproofing agents, light fastness improvers, surface active agents, and other additives in addition to the pigment and aqueous binder.

The mordant to be added to the ink receiving layer is preferably immobilized. In that regard, polymeric mordants are preferably used. Polymeric mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing the polymeric mordants disclosed in JP-A-1-161236, pp. 212-215 are particularly preferred. The polymeric mordants of JP-A-1-161236 are effective to form images of high quality and improved light fastness on the image receiving layer.

Waterproofing agents are effective to render images waterproof. Cationic resins are preferred waterproofing agents.

Examples of suitable cationic resins are polyamide-polyamine-epichlorohydrin, polyethylene-imine, polyamine sulfone, dimethyldiallylammonium chloride polymer, cationic polyacrylamide, and colloidal silica. Polyamide-polyamine-epichlorohydrin is particularly suited. The cationic resin is preferably used in an amount of 1 to 15% by weight, still preferably 3 to 10% by weight, based on the total solids content of the ink receiving layer.

Light fastness improvers include zinc sulfate, zinc oxide, hindered amine antioxidants, and benzophenone or benzotriazole ultraviolet absorbers. Zinc sulfate is particularly suitable.

Surface active agents in the image receiving layer functions as a coating aid, a peeling resistance improver, a slip improver or an antistatic agent. Useful surface active agents are described in JP-A-62-173463 and JP-A-62-183457. Organic fluorine compounds may be used in place of the surface active agents. Hydrophobic organic fluorine compounds, such as fluorine surface active agents, oily fluorine compounds (e.g., fluorine oil), and solid fluorine compounds (e.g., tetrafluoroethylene resin), are preferred. Details of the organic fluorine compounds are described in JP-B-57-9053 (cols. 8-17), JP-A-61-20994 and JP-A-62-135826. Other additives that can be added to the ink-receiving layer include pigment dispersants, thickeners, defoaming agents, dyes, fluorescent whitening agents, antiseptics, pH adjustors, matting agents, and hardeners. The ink-receiving layer can have a single or double layer structure.

The backcoating layer, which can be provided if desired, is formed of a white pigment, an aqueous binder, and additives. The white pigment includes inorganic ones such as light precipitated calcium carbonate, heavy calcium carbonate, kaolin, talc, calcium sulfate, barium sulfate, titaniumdioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic ones such as styrene plastic pigments, acrylic plastic pigments, polyethylene, hollow particles, urea resins, and melamine resins.

Aqueous binders which can be used in the backcoating layer include water-soluble polymers such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone; and water-dispersible polymers such as styrene-butadiene latices and acrylic emulsions. Additives which can be used in the backcoating layer include defoaming agents, foam-suppressors, dyes, fluorescent whitening agents, antiseptics, and waterproofing agents.

A polymer latex may be incorporated into any layer constituting the paper or film for ink-jet recording inclusive of the backcoating layer for the purpose of improving film properties, for example, dimensional stabilization, curling prevention, anti-blocking, and crack prevention. For the details refer to JP-A-62-245258, JP-A-62-136648, and JP-A-62-110066. Addition of a polymer latex having a low glass transition temperature (40° C. or lower) into a layer containing a mordant will prevent cracking or curling. Addition of a polymer latex having a high glass transition temperature to a backcoating layer is also effective for curling prevention.

The ink-jet ink according to the present invention is applicable to any known ink jet recording systems, such as an electrostatic system in which ink droplets are ejected by an electrostatic attracting force, a drop-on-demand system in which vibrating pressure by a piezoelectric element is utilized (pressure pulse system), an acoustic system in which electrical signals are converted to an acoustic beam, which is applied to ink, and ink is ejected by making use of a radiating pressure, and a thermal system in which vapor bubbles are generated by heat to eject ink droplets. Further, ink jet recording includes a system in which a number of fine droplets of low concentration ink called photoink are ejected, a system in which a plurality of ink formulations having substantially the same hue but different concentrations are used to improve image quality, and a system of using colorless transparent ink.

EXAMPLES

The present invention will now be illustrated in greater detail with reference to Examples, but it should be understood that the invention is not deemed to be limited thereto. Unless otherwise noted, all the percents and parts are by weight.

Example 1

Preparation of Ink Compositions:

The components of the following formulation were mixed, and deionized water was added to make one liter. The mixture was heated at 30° to 40° C. for 1 hour while stirring. The pH of the mixture was adjusted to 9 with a 10 mol/l aqueous solution of lithium hydroxide, and the mixture was filtered under pressure through a microfilter with an average pore size of 0.25 μm to prepare ink composition A.

| Formulation of Ink Composition A: | |
|---|---|
| Dye (b-2) of the invention | 25 g |
| Diethylene glycol | 20 g |
| Glycerol | 120 g |
| Diethylene glycol monobutyl ether | 230 g |
| 2-Pyrrolidone | 80 g |
| Triethanolamine | 17.9 g |
| Benzotriazole | 0.06 g |
| Surfynol TG | 8.5 g |
| Proxel XL2 | 1.8 g |

Ink compositions B to E were prepared in the same manner as for ink composition A, except for replacing dye (b-2) with the same molar quantity of the azo dye shown in Table 7 below. For comparison, ink composition 1 was prepared in the same manner as for ink composition A, except for replacing dye (b-2) with the same molar quantity of the comparative dye (f).

Image Recording and Evaluation:

The solution stability of the dyes used in the ink compositions was evaluated as follows. An image was recorded on photo glossy paper (PM Glossy Photo Paper KA420PSK available from Seiko Epson Corp.) on an ink jet printer (PM-700C, available from Seiko Epson Corp.) by using each of ink compositions A to E and 1. The resulting image was evaluated for paper independence, water resistance, light fastness, heat fastness, and ozone fastness in accordance with the following test methods. The results obtained are shown in Table 7.

1) Solution Stability

In 10 ml of water was dissolved 0.1 mmol of a dye under test, and 84 mg of $NaHCO_3$ was added to the solution, followed by heating under reflux for 1 hour. After cooling, the absorbance of the solution was measured to determine the dye residual ratio. A dye having a residual ratio of 80% or higher is graded A; 60% or higher but lower than 80%, B; and lower than 60%, C.

2) Paper Independence

The color tone was compared between the image on the glossy photo paper and the image separately recorded on plain paper for plain paper copiers with the same ink composition. An ink composition showing a small difference in color tone was graded A, and one showing a large difference was graded B.

3) Water Resistance

The glossy photo paper having an image formed thereon was dried at room temperature for 1 hour, then soaked in deionized water for 10 seconds, and dried spontaneously at room temperature. Feathering of the ink image was observed, and water resistance of the ink was graded A (no feathering), B (slight feathering) or C (considerable feathering).

4) Light Fastness

The printed image was exposed to xenon light (85,000 lux) for 7 days in a weather-o-meter (Atlas C.I65, from Atlas Electric Devices Co.). The image density was measured before and after the exposure with a reflection densitometer X-Rite 310TR. Dye residual ratio (%) was calculated at three points whose densities before exposure were 1, 1.5, and 2.0. An image having a dye residual ratio of 70% or higher at every measuring point was graded A. An image having a dye residual ratio lower than 70% at one or two out of three points was graded B. An image having a dye residual ratio lower than 70% at every point was graded C.

5) Heat Fastness

The glossy photo paper was allowed to stand at 80° C. and 15% RH for seven days. The image density was measured before and after the heat exposure with a reflection densitometer X-Rite 310TR. Dye residual ratio (%) was calculated at three points whose densities before heat exposure were 1, 1.5, and 2.0. An image having a dye residual ratio of 90% or higher at every measuring point was graded A. An image having a dye residual ratio lower than 90% at one or two out of three points was graded B. An image having a dye residual ratio lower than 90% at every point was graded C.

6) Ozone Fastness

The glossy photo paper having an image formed thereon was left to stand in a chamber having an ozone gas concentration of 0.5±0.1 ppm at room temperature in a dark place for seven days. A dye residual ratio after exposure to ozone was obtained on three measuring points in the same manner as for evaluation of light fastness. The ozone concentration in the chamber was set with an ozone gas monitor (OZG-EM-01, available from Applics Co., Ltd.). An image having a dye residual ratio of 70% or higher at every measuring point was graded A. An image having a dye residual ratio lower than 70% at one or two out of three points was graded B. An image having a dye residual ratio lower than 70% at every point was graded C.

TABLE 7

| Ink | Dye | Paper Independence | Water Resistance | Light Fastness | Heat Fastness | Ozone Fastness | Soln. Stability |
|---|---|---|---|---|---|---|---|
| A | b-2 | A | A | A | A | A | A |
| B | b-3 | A | A | A | A | A | A |
| C | a-1 | A | A | A | A | A | A |
| D | a-2 | A | A | A | A | A | A |
| E | a-3 | A | A | A | A | A | A |
| 1 | f | A | A | A | A | A | C |

As can be seen from Table 7, the dyes of the present invention exhibit higher solution stability than the comparative azo dye (f). The images recorded with the ink compositions A to E of the present invention are superior in light fastness and ozone fastness.

Furthermore, an image was recorded on glossy paper dedicated for ink jet recording (Super Fine MJA4S3P, available from Seiko Epson Corp.) on an ink jet printer (PM-700C, available from Seiko Epson Corp.) by using each of ink compositions A to E. Evaluation of the resulting images for hue and light fastness gave satisfactory results similar to those shown in Table 7.

Example 2

Printing was carried out in the same manner as in Example 1, except for using glossy photo paper EX available from Fuji Photo Film co., Ltd. Evaluated in the same manner as in Example 1, the recorded images gave the same results as in Example 1.

Example 3

Ink jet printing was carried out on glossy photo paper GP-301 (available from Canon Inc.) on an ink jet printer BJ-F850 (from Canon Inc.) loaded with an ink cartridge filled with each of the ink compositions prepared in Example 1. The results of evaluation of the images were equal to those obtained in Example 1.

This application is based on Japanese Patent application JP 2003-173485, filed Jun. 18, 2003, and Japanese Patent application JP 2003-353498, filed Oct. 14, 2003, the entire contents of which are hereby incorporated by reference, the same as if set forth at length.

The invention claimed is:

1. An ink containing an azo dye having, in total, at least 13 conjugated π electrons in an aromatic ring thereof that is not directly bonded to any azo group, wherein the azo dye is represented by the following formula (8):

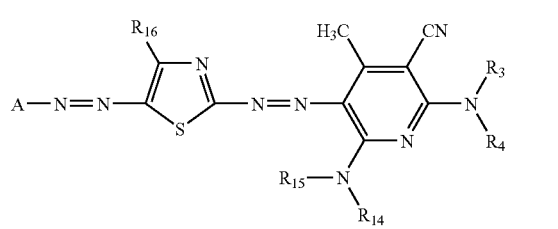

(8)

wherein A represents a substituted or unsubstituted aromatic ring or a substituted or unsubstituted heterocyclic ring; $R_3$ and $R_4$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may have a substituent, provided that $R_3=R_4\neq H$; $R_{14}$ and $R_{15}$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; and $R_{16}$ represents a substituted phenyl group, an unsubstituted naphthyl group or a substituted heterocyclic group.

2. An ink containing an azo dye having a residual ratio improved by introducing, to a starting azo dye whose residual ratio is 60% or lower as measured in accordance with a stability test method, an aromatic ring in such an amount to add at least 6 conjugated π electrons at a position that is not directly bonded to any azo group of the starting azo dye, wherein the azo dye is represented by the following formula (8):

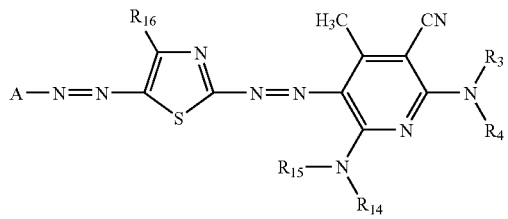
(8)

wherein A represents a substituted or unsubstituted aromatic ring or a substituted or unsubstituted heterocyclic ring; $R_3$ and $R_4$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of which may have a substituent, provided that $R_3$=$R_4$≠H; $R_{14}$ and $R_{15}$ each represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group; and $R_{16}$ represents a substituted phenyl group, an unsubstituted naphthyl group or a substituted heterocyclic group, the stability test method comprising dissolving 0.1 mmol of a dye under test in 10 ml of water to form a solution, adding 84 mg of sodium hydrogencarbonate to the solution to form a mixture, heating the mixture under reflux for 1 hour, cooling the heated mixture, and spectrophotometrically measuring the residual ratio of the dye.

3. The ink according to claim 1, wherein the azo dye is a water-soluble disazo or polyazo dye.

4. The ink according to claim 2, wherein the azo dye is a water-soluble disazo or polyazo dye.

5. The ink according to claim 1, wherein the azo dye shows a maximum absorption in dimethylformamide at a wavelength of from 570 nm to 680 nm.

6. The ink according to claim 2, wherein the azo dye shows a maximum absorption in dimethylformamide at a wavelength of from 570 nm to 680 nm.

7. The ink according to claim 1, wherein the azo dye has an oxidation potential more noble than 1.0 V (vs. SCE).

8. The ink according to claim 2, wherein the azo dye has an oxidation potential more noble than 1.0 V (vs. SCE).

9. The ink according to claim 1, wherein a difference between a maximum absorption wavelength of the azo dye in dimethylformamide and that in water is 30 nm or more.

10. The ink according to claim 2, wherein a difference between a maximum absorption wavelength of the azo dye in dimethylformamide and that in water is 30 nm or more.

11. The ink according to claim 1, wherein the azo dye has a ratio of molar absorptivity in water to that in dimethylformamide of 0.9 or smaller.

12. The ink according to claim 2, wherein the azo dye has a ratio of molar absorptivity in water to that in dimethylformamide of 0.9 or smaller.

13. An ink-jet recording ink containing the ink according to claim 1.

14. An ink-jet recording ink containing the ink according to claim 2.

* * * * *